US007130261B1

(12) United States Patent
Skrzynski et al.

(10) Patent No.: US 7,130,261 B1
(45) Date of Patent: Oct. 31, 2006

(54) HIERARCHICAL DEPENDABILITY FOR OPEN DISTRIBUTED ENVIRONMENTS

(75) Inventors: Mark Skrzynski, Capitola, CA (US); Vijay K. Misra, Fremont, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 1017 days.

(21) Appl. No.: 09/586,557

(22) Filed: May 31, 2000

(51) Int. Cl.
*H04J 1/16* (2006.01)
(52) U.S. Cl. ............................ 370/216; 370/241; 714/2
(58) Field of Classification Search ........ 370/216–218, 370/221, 241–244, 352; 379/1.01, 1.03, 379/2, 9, 9.04, 9.05, 10.01, 14; 714/100, 714/2, 3, 4, 10, 30, 40, 27, 57
See application file for complete search history.

(56) References Cited

U.S. PATENT DOCUMENTS

| 5,261,044 | A | * | 11/1993 | Dev et al. .................... 345/855 |
| 5,293,556 | A | * | 3/1994 | Hill et al. .................... 702/184 |
| 5,528,586 | A | | 6/1996 | Ebert et al. |
| 5,594,864 | A | * | 1/1997 | Trauben ...................... 714/39 |
| 5,655,154 | A | | 8/1997 | Jain et al. |
| 5,721,876 | A | | 2/1998 | Yu et al. |
| 5,768,501 | A | * | 6/1998 | Lewis .......................... 714/48 |
| 5,784,359 | A | * | 7/1998 | Bencheck et al. ........... 370/244 |
| 5,802,367 | A | | 9/1998 | Held et al. |
| 5,832,503 | A | * | 11/1998 | Malik et al. ................. 709/223 |
| 5,854,789 | A | | 12/1998 | Lesch et al. |
| 5,883,939 | A | | 3/1999 | Friedman et al. |
| 5,907,701 | A | | 5/1999 | Hanson |
| 5,913,036 | A | * | 6/1999 | Brownmiller et al. ....... 709/224 |
| 5,946,373 | A | * | 8/1999 | Harris ...................... 379/14.01 |
| 5,958,010 | A | * | 9/1999 | Agarwal et al. ............. 709/224 |
| 5,974,114 | A | | 10/1999 | Blum et al. |
| 5,987,517 | A | | 11/1999 | Firth et al. |

(Continued)

FOREIGN PATENT DOCUMENTS

EP    0 371 941 A2    6/1990

(Continued)

OTHER PUBLICATIONS

Friesen, Jeff, "The Win32-Java Hybrid," JavaWorld, Jul. 1999, p. 1-5.

(Continued)

*Primary Examiner*—Dmitry Levitan

(57) ABSTRACT

Systems and methods that are operable in open distributed environments, such as ToL and other similar systems are described. One dependability system includes a hierarchical arrangement of two or more nodes each having a fault analyzer object programmed to respond to status information relating to an associated system of one or more objects based upon a respective set of policies designed to improve object availability. The dependability system may be implemented in a telephony system. The telephony system may include a packet switched network, a gatekeeper coupled to the packet switched network, and a server coupled to the packet switched network and configured to process telephone calls over the packet switched network. A dependability method that is implemented in a distributed packet switched network also is described. In accordance with this method, status information relating to one or more component objects of a node in a hierarchical arrangement of two or more nodes is received at a lower-level node. In response to the received status information a component object control instruction for controlling the operational state of one of the component objects is issued at the lower-level node based upon a respective set of policies designed to improve object availability. A status report is issued from the lower-level node to a higher-level node in the hierarchical arrangement of nodes.

11 Claims, 3 Drawing Sheets

U.S. PATENT DOCUMENTS

| | | | |
|---|---|---|---|
| 6,014,666 A | 1/2000 | Helland et al. | |
| 6,038,288 A | 3/2000 | Thomas et al. | |
| 6,069,875 A * | 5/2000 | Miller et al. | 370/244 |
| 6,185,609 B1 | 2/2001 | Rangarajan et al. | |
| 6,229,537 B1 | 5/2001 | Sobeski et al. | |
| 6,308,282 B1 * | 10/2001 | Huang et al. | 714/4 |
| 6,363,421 B1 * | 3/2002 | Barker et al. | 709/223 |
| 6,405,216 B1 | 6/2002 | Minnaert et al. | |
| 6,496,865 B1 | 12/2002 | Sumsion et al. | |
| 6,606,304 B1 * | 8/2003 | Grinter et al. | 370/252 |
| 6,826,718 B1 * | 11/2004 | Wu | 714/46 |

FOREIGN PATENT DOCUMENTS

| | | |
|---|---|---|
| EP | 0 770 958 A1 | 10/1995 |
| EP | 1 126 685 A2 | 8/2001 |
| GB | 2 278 468 A1 | 11/1994 |
| GB | 2 354 092 A1 | 3/2001 |
| WO | WO 98/002808 A1 | 1/1998 |
| WO | WO 00/687790 A1 | 11/2000 |

OTHER PUBLICATIONS

Friesen, Jeff, "Merging Java and Win32: A New Way to Develop Windows Applications," JavaWorld, Jul. 1998, p. 1-12.

* cited by examiner

| | EVENT | POLICY | ACTION |
|---|---|---|---|
| 80 | Component Error | Reset Component ⟵ 84 | Restart Component ⟵ 82 |
| 86 | Error & Time Violation | Reset & Report ⟵ 90 | Restart Component; Send Err_Msg ⟵ 88 |

HIERARCHICAL DEPENDABILITY FOR OPEN DISTRIBUTED ENVIRONMENTS

RESERVATION OF COPYRIGHT

A portion of the disclosure of this patent document contains material which is subject to copyright protection. The copyright owner has no objection to the facsimile reproduction by anyone of the patent document of the patent disclosure, as it appears in the Patent and Trademark Office patent file or records available to the public, but otherwise reserves all copyright rights whatsoever.

CROSS-REFERENCE TO RELATED APPLICATIONS

This application is related to commonly-assigned U.S. application Ser. No. 09/586,245, filed on even date herewith, by Mark Skryznski and Huy Ton, issued on Feb. 10, 2004 as U.S. Pat. No. 6,691,302, and entitled "Interfacing a Service Component to a Native API," which is incorporated herein by reference.

TECHNICAL FIELD

This invention relates to hierarchical dependability systems and methods operable in open distributed environments.

Dependability is incorporated into a system to improve the availability of system components and to improve the reliability of the overall system. Such dependability considerations are especially important for telephony systems. For example, dependability is required to complete a telephone call quickly, to meet stringent quality of service (QoS) requirements, and to maintain a call connection for the duration of a telephone conversation. To achieve a high level of system dependability, telephony system manufacturers add both hardware and software monitoring and maintenance features to identify and possibly correct maintenance problems. Most telephony system components, such as public switched telephone network (PSTN) nodes, are closed systems that have dependability systems tightly integrated with the hardware and software elements of the system. More recent telephony systems, however, are operated in open environments. For example, the HiNet™ RC 3000 telephony-over-LAN (ToL) application, which is available from Siemens Information and Communication Networks, Inc., provides a real-time communications system that is designed to operate over an open Internet Protocol (IP) networking infrastructure for data, voice and video applications.

SUMMARY

The invention features dependability systems and methods that are operable in open distributed environments, such as ToL and other similar systems.

In one aspect, the invention features a dependability system, comprising a hierarchical arrangement of two or more nodes each having a fault analyzer object programmed to respond to status information relating to an associated system of one or more objects based upon a respective set of policies designed to improve object availability.

In another aspect, the invention features the above-described dependability system implemented in a telephony system. The telephony system includes a packet switched network, a gatekeeper coupled to the packet switched network, and a server coupled to the packet switched network and configured to process telephone calls over the packet switched network.

The invention also features a dependability method implemented in a distributed packet switched network. In accordance with this inventive method, status information relating to one or more component objects of a node in a hierarchical arrangement of two or more nodes is received at a lower-level node. In response to the received status information a component object control instruction for controlling the operational state of one of the component objects is issued at the lower-level node based upon a respective set of policies designed to improve object availability. A status report is issued from the lower-level node to a higher-level node in the hierarchical arrangement of nodes. The status report issued by the lower-level node preferably relates to the state of health of a lower-level component object. The status report issued by the lower-level node also may relate to the overall state of health of the lower-level node.

Other features and advantages of specific embodiments of the invention will become apparent from the following description, including the drawings and the claims.

DETAILED DESCRIPTION OF SPECIFIC EMBODIMENTS

The invention provides portable and scalable dependability solutions that are operable in open distributed environments. These inventive dependability systems and methods readily accommodate dynamic system configuration changes and potentially unreliable components. The dependability provided by the invention requires little user intervention, and allows the fault analysis logic to be changed (i.e., reconfigured) on-the-fly without bringing down the system (e.g., there is no need to stop or recompile the system). Thus, the invention allows system components and decision logic to be reconfigured dynamically.

Specific embodiments of the present invention may include one or more of the following features. A first fault analyzer object preferably is configured to report object status information to a second fault analyzer object. The first fault analyzer object may be configured to register with the second fault analyzer object. A fault analyzer object preferably is assigned responsibility for one or more component objects. The component objects may correspond to software applications. The system preferably includes a component interface configured to connect the fault analyzer object to the one or more component objects. The fault analyzer object may be configured to issue to the component interface object control instructions for changing the operational state of one or more of the component objects.

Each fault analyzer object preferably is configured to determine the health of the assigned system. Each fault analyzer may include logic in the form of a dynamic linked library for determining the health of the assigned system.

Each dynamic linked library may be dynamically replaceable. Additionally, each of the fault analyzer objects preferably includes a state machine. The state machine may be dynamically replaceable. The state machine may be event driven, or it may automatically change state, or both.

The system may include multiple instances of a fault analyzer object. The nodes may be implemented on a single network system or on separate systems of a packet switched network. Each fault analyzer object preferably is implemented in software.

Figure 1:
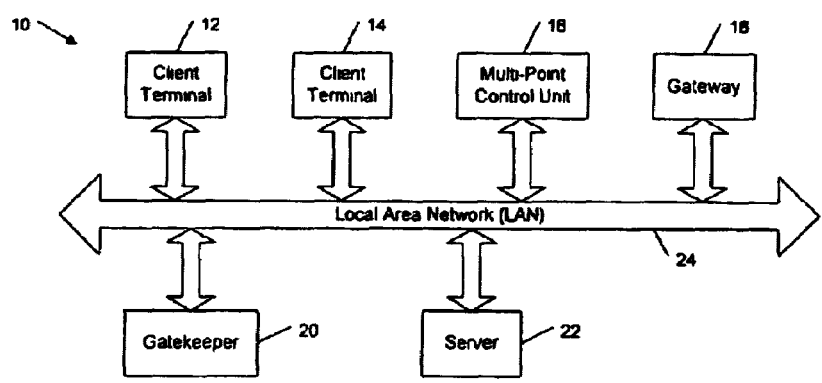
FIG. 1 is a block diagram of a ToL system.

In particular, specific embodiments are discussed further below. Referring to FIG. 1, a packet switched network 10 (e.g. a HiNet™ RC 3000 ToL system, which is available from Siemens Information and Communication Networks, Inc.) includes client terminals 12, 14, a multi-point control unit 16, a gateway 18, a gatekeeper 20 and a server 22. Each of the systems 12–22 is connected to a local area network (LAN) 24. Data, voice and video information may be transmitted over network 10 in accordance with connection-oriented network protocols (e.g., Transmission Control Protocol/Internet Protocol (TCP/IP)) or connectionless protocols (e.g., Ethernet, Internetwork Packet Exchange (IPX), and User Datagram Protocol (UDP)). Packet switched network 10 preferably operates in compliance with international standards for multimedia call control and application sharing (e.g., Session Initiation Protocol (SIP) or H.323 for call control and T.128 for application sharing).

Gateway 18 may connect network 10 to a Private Branch Exchange (PBX) system, an Integrated Services Digital Network (ISDN) or the Public Switched Telephone Network (PSTN). Gateway 18 translates transmission formats, communication procedures, and audio and video coder/decoder (CODECs) between H.323 and non-H.323 terminal types. Gateway 18 also sets up and clears calls for packet switched network 10 and for the circuit switched PBX and ISDN/PSTN networks. Gatekeeper 20 acts as the central point for calls and provides call control services (e.g., translation from LAN aliases for terminals and gateways to IP or IPX addresses. Client terminals 12, 14 may be in the form of terminal adapters, IP telephones, personal computers and other compatible communication devices.

Figure 2:
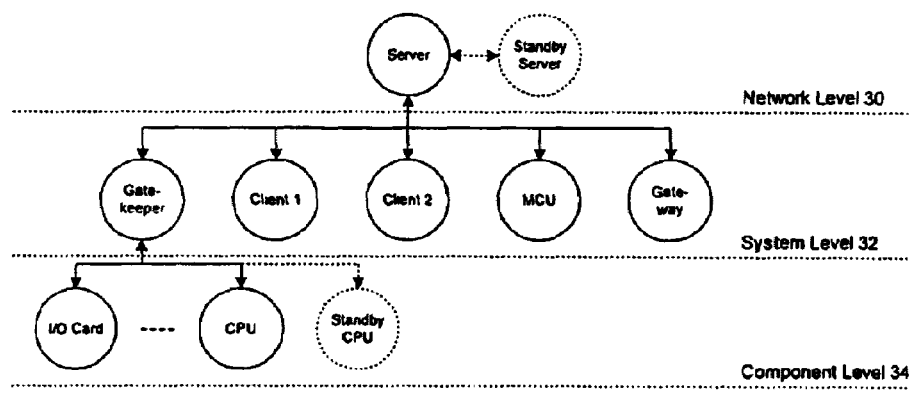
FIG. 2 is a diagrammatic view of a hierarchical arrangement of nodes corresponding to components of the ToL system of FIG. 1, according to a specific embodiment of the invention.

As shown in FIG. 2, network 10 includes a distributed dependability system that, according to a specific embodiment of the invention, may be represented as a hierarchical arrangement of nodes. One or more nodes may be contained in each of the physical systems 12–22 of network 10. The dependability system monitors the status of one or more components at each of a several different hierarchical levels 30, 32 and 34 of network 10. At network level 30, for example, the dependability system receives status information from system level 32, determines the state of "health" of the overall network 10 and takes corrective action (if necessary) based upon a set of programmed network level policies (e.g., policies relating to load sharing and system availability policies). At system level 32, the dependability system receives status information from each system component, determines the state of health of the assigned system and responds to that determination based upon a set of policies appropriate for the assigned system. Each system of network 110 may be stratified further into a component level 34, which corresponds to a logical hierarchy of system hardware, software and firmware resources. For example, gatekeeper 20 may include a system level fault analyzer object for determining the state of health of the gatekeeper system and one or more component level fault analyzers for other components (e.g., a central processing unit (CPU), a standby CPU, an input/output (I/O) card, and one or more software components) operating inside the gatekeeper system. Many of the nodes of network 10 and many of the connections between the nodes may be duplicated. Such redundancy would improve the reliability and fault tolerance of each system and the dependability of the overall network.

According to a specific embodiment, each fault analyzer object in the dependability system is assigned responsibility for one or more objects representing the components of a node of network 10. Objects may be grouped into different classes. For example, a gatekeeper class may correspond to objects providing gatekeeper functionality, and a fault analyzer class may correspond to objects providing fault analysis functionality. Each object operates in accordance with a dynamically updateable state machine model. In particular, an object remains in a current state for a fixed period or until an event is received, at which time the object changes state in accordance with the associated state machine model. Each fault analyzer evaluates fault conditions and corrects fault conditions (if possible) in the components of the associated node. In addition, each fault analyzer may determine the impact of fault conditions on the operability of each assigned object and the overall operability of the associated node. This information may be reported to a fault analyzer at a higher level in the dependability hierarchy.

Figure 3:
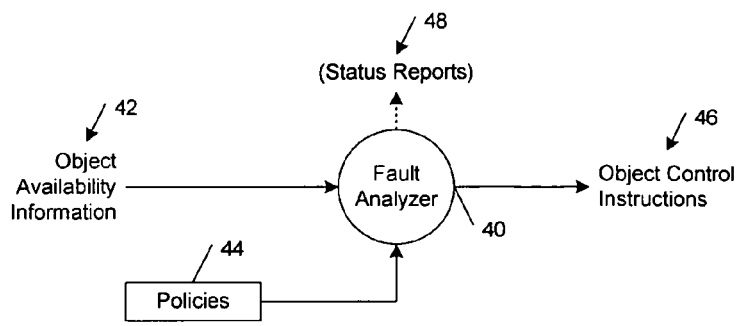
FIG. 3 is a diagrammatic view of a fault analyzer object of a ToL system node, according to a specific embodiment of the invention.

Referring to FIG. 3, according to some specific embodiments, each node of the dependability system includes a fault analyzer object 40. Fault analyzer object 40 receives status information 42 relating to the availability of one or more objects (e.g., component objects or fault analyzer objects, or both) for which fault analyzer object 40 has responsibility. Fault analyzer object 40 analyzes this information 42 and, based upon a set of programmable policies 44, issues one or more component object control instructions 46 for the objects assigned to fault analyzer object 40, and issues one or more fault analyzer object control instructions 47 for lower-level fault analyzer objects (if any) shown in FIG. 4. For example, if the current state of a critical component indicates that the component is hung, fault analyzer object 40 may issue component object control instructions to deactivate the hung component and to activate a standby dormant component with similar functionality. Fault analyzer object 40 also may issue one or more status reports 48 (e.g., error or warning messages) for an assigned higher-level fault analyzer object.

In one specific embodiment, fault analyzer object 40 is implemented as a platform-independent object-oriented program. The logic for fault analysis is contained in a dynamic linked library (DLL) that may be loaded dynamically on demand. The objects over which fault analyzer object 40 has responsibility are identified in a linked list (or graph) 49 seen in FIG. 4, and the DLL controls how fault analyzer object 40 processes the list to determine the state of health of associated node, and determines the kind of corrective action that fault analyzer object 40 will take. The DLL may be replaced dynamically through a registry key value. When the value in the registry key is changed, an event is generated that causes the same DLL or a replacement DLL to be loaded. This feature enables the logic to be changed on-the-fly without bringing down the system.

Figure 4:
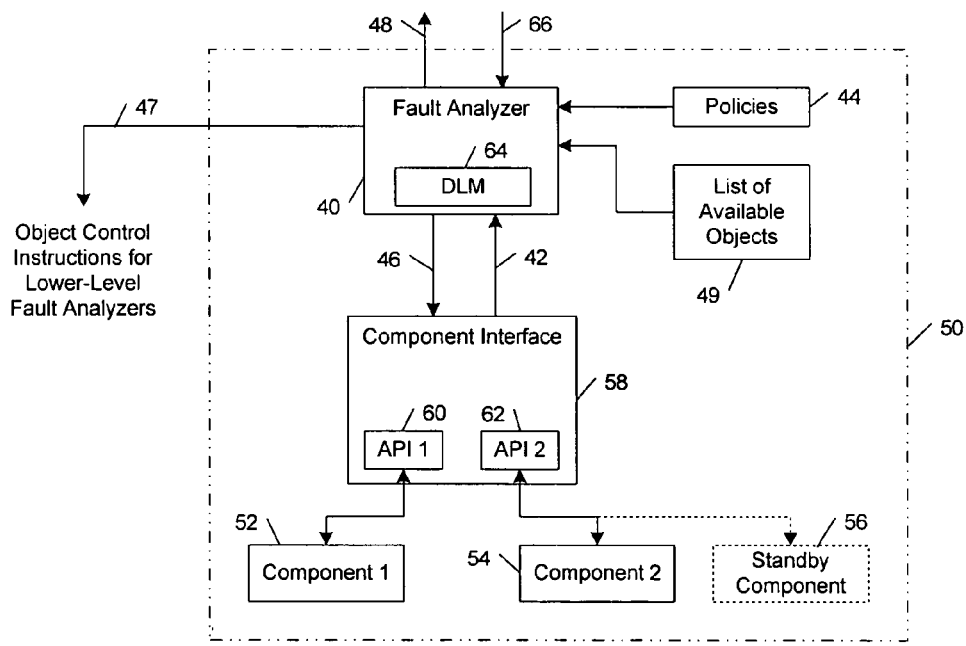
FIG. 4 is a block diagram of a ToL system node, according to a specific embodiment of the invention.

As shown in FIG. 4, each dependability node 50 includes a fault analyzer object 40 and one or more components 52, 54, 56 (e.g., software or firmware components). Fault analyzer object 40 communicates with components 52–56 through a component interface 58, which includes a respective application program interface (API) 60, 62 for each of the components 52–56. Fault analyzer object 40 treats each component 52–56 as a black box and does not make any assumptions about the internals of objects 52–56; components 52–56 simply must support interfaces 60, 62 specified by component interface 58. When node 50 is first activated, each component 52–56 registers with fault analyzer object 40. In addition, fault analyzer 40 registers with a higher-level fault analyzer object, if one has been assigned. Fault analyzer object 40 includes a dynamic logic module (DLM) 64 that receives status information from component interface 58 relating to the operational status of components 52–56, and determines the state of health of node 50 and the state of health of each of the components 52–56. Based upon the programmed set of policies 44, fault analyzer object 40 issues object control instructions for execution by component interface 58. Fault analyze object 40 also may incorporate into its state of health determinations object control instructions 66 received from an assigned higher-level fault analyzer object. These instructions may be used for load balancing to improve network performance. In one embodiment, component 54 may be a central processing unit (CPU) operating in an active mode, and component 56 may be a duplicate CPU operating in a hot standby mode. Such redundancy would improve the reliability and the fault tolerance of node 50. For example, upon receiving fault condition information from component 54, fault analyzer 40 may deactivate component 54 and activate component 56. Additional redundancy preferably is built into network 10.

Figures 5, 6:
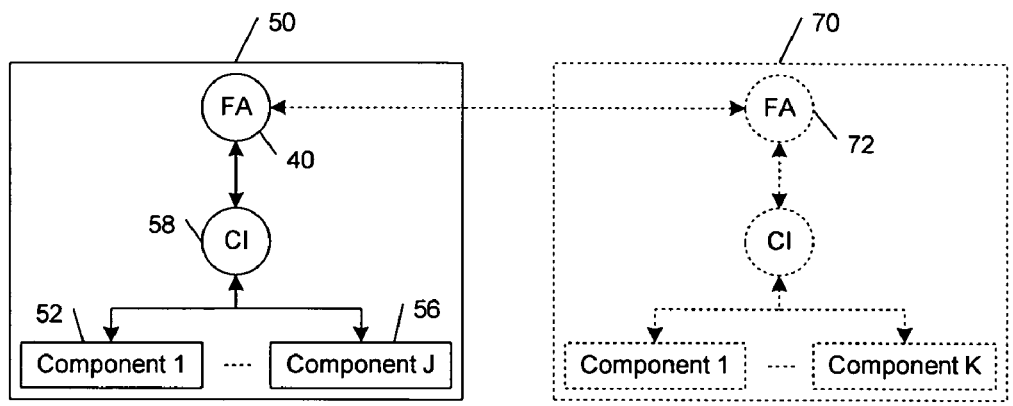
FIG. 5 is a block diagram of a hierarchical arrangement of nodes, according to a specific embodiment of the invention.
FIG. 6 is a chart of two examples of programmed policies for a fault analyzer object, according to specific embodiments of the invention.

As shown in FIG. 5, the functionality of node 50 may be duplicated in its entirety by a node 70, according to a specific embodiment. Nodes 50 and 70 communicate through respective fault analyzer objects 40, 72. In one embodiment, fault analyzer object 40 may determine whether the state of health of node 50 is better or worse than the state of health of node 70. If node 70 has a better state of health, fault analyzer object 40 may activate node 70 and operate node 50 in a hot standby mode. Nodes 50 and 70 may be implemented on the same or different network systems.

According to a specific embodiment and referring to FIG. 6, in operation a fault analyzer object may be programmed with a set of policies to improve the availability of components of network 10 as follows. If the fault analyzer object receives notification (80) of a component object error, the fault analyzer may respond by restarting (82) the component in accordance with a policy (84) designed to handle such an error notification. If the fault analyzer receives a notification (86) of a component error and a time constraint violation, the fault analyzer may respond by restarting the component and issuing an error message to a higher-level fault analyzer (88) in accordance with an appropriate policy (90). The fault analyzer may be programmed to respond to other event conditions in a similar way. In general, the programmed policies are designed to improve the availability of the components assigned to the fault analyzer object and to improve the dependability of the overall network 10.

In one embodiment, the dependability system is operable under the Windows NT operating system and is implemented by a plurality of Windows NT services written in a variety of different programming languages. The different service modules may interface with the native Windows NT operating system through a generic interface that is described in commonly-assigned U.S. application Ser. No. 09/588,245, filed on even date herewith, by Mark Skrzynksi and Huy Ton, issued on Feb. 10, 2004 as U.S. Pat. No. 6,691,302, and entitled "Interfacing a Service Component to a Native API," which is incorporated herein by reference.

Other embodiments are within the scope of the claims.

What is claimed is:

1. A dependability system, comprising a hierarchical arrangement of two or more nodes each having a fault analyzer object programmed to respond to status information relating to an associated system of one or more objects, said status information including an object error, said associated system of one or more objects including an active object and an inactive object, wherein a first fault analyzer object is configured to report object status information to a second fault analyzer object, the first fault analyzer object being configured to register with the second fault analyzer object, said first fault analyzer deactivating said active object when status information indicates an error with said active object and activating said inactive object.

2. The system of claim 1, wherein a fault analyzer object is assigned responsibility for one or more component objects.

3. The system of claim 2, wherein the component objects correspond to software applications.

4. The system of claim 2, further comprising a component interface configured to connect the fault analyzer object to the one or more component objects.

5. The system of claim 1, wherein each fault analyzer object is configured to determine the health of the assigned system.

6. The system of claim 1, wherein a fault analyzer object includes a state machine.

7. The system of claim 1, wherein the nodes are implemented on a single network system.

8. The system of claim 1, wherein the nodes are Implemented on separate systems of a packet switched network.

9. The system of claim 1, wherein each fault analyzer object is implemented in software.

10. A dependability system, comprising a hierarchical arrangement of two or more nodes each having a fault analyzer object programmed to respond to status information relating to an associated system of one or more component objects and a component interface configured to connect the fault analyzer object to the associated system of one or more component objects, said status information including an object error, the one or more component objects including an active object and an inactive object, wherein the fault analyzer object is configured to issue to the component interface object control instructions for changing an operational state of one or more of the component objects, said active object being deactivated when status information indicates an error with said active object and said inactive object being activated.

11. A telephony system, comprising:
   a packet switched network;
   a gatekeeper coupled to the packet switched network;
   a server coupled to the packet switched network and configured to process telephone calls over the packet switched network; and
   a dependability system comprising a hierarchical arrangement of two or more nodes each having a fault analyzer object programmed to respond to received status information relating to an assigned system of one or more objects of the telephony system, said status information including an object error, said assigned system of one or more objects including an active object and an inactive object, wherein a first fault analyzer object is configured to report object status information to a second fault analyzer object, the first fault analyzer object being configured to register with the second fault analyzer object, said first fault analyzer deactivating said active object when status information indicates an error with said active object and activating said inactive object.

* * * * *